United States Patent
Latiri

[19]

[11] Patent Number: 5,814,773
[45] Date of Patent: Sep. 29, 1998

[54] GOLF CLUB SURVEY INSTRUMENT WITH VARIABLE FULCRUM

[76] Inventor: Mondher Latiri, 7F 95-5 Shin-Gia Road, Feng-Shan, Kaohsiung, Taiwan

[21] Appl. No.: 767,366

[22] Filed: Dec. 16, 1996

Related U.S. Application Data

[63] Continuation-in-part of Ser. No. 659,925, Jun. 7, 1996.

[51] Int. Cl.[6] .................................................. A63B 53/00
[52] U.S. Cl. ........................ 177/171; 177/172; 177/236; 177/245; 177/251; 73/65.03
[58] Field of Search .................... 73/65.03; 473/289, 473/292; 177/171, 172, 236, 251, 245

[56] References Cited

U.S. PATENT DOCUMENTS

| | | | |
|---|---|---|---|
| 2,963,286 | 12/1960 | Fischer | 177/245 |
| 3,703,824 | 11/1972 | Osborne et al. | 73/65.03 |
| 4,043,184 | 8/1977 | Sayers | 73/65.03 |
| 4,058,312 | 11/1977 | Stuff et al. | 73/65.03 |
| 4,212,193 | 7/1980 | Turley | 73/65.03 |
| 4,261,566 | 4/1981 | MacDougall | 73/65.03 |
| 5,094,101 | 3/1992 | Chastonay | 73/65.03 |
| 5,277,059 | 1/1994 | Chastonay | 73/65.03 |
| 5,285,680 | 2/1994 | Sun | 73/65.03 |
| 5,362,928 | 11/1994 | Pavlik | 177/172 |
| 5,417,108 | 5/1995 | Chastonay | 73/65.03 |

FOREIGN PATENT DOCUMENTS

| | | |
|---|---|---|
| 443209 | 2/1936 | United Kingdom . |
| 557192 | 11/1943 | United Kingdom . |
| 1220804 | 1/1971 | United Kingdom . |

*Primary Examiner*—Michael L. Gellner
*Assistant Examiner*—Randy W. Gibson
*Attorney, Agent, or Firm*—Richard C. Litman

[57] ABSTRACT

A golf club survey instrument includes a weight scale and a variably positionable fulcrum, enabling the instrument to be used determine the total weight of a golf club or the weight of each of its separate components, the swing weight of the club, and the center of gravity of the club. A linear scale also provides for the determination of the length of the club, or club components such as the shaft, grip, etc. The instrument comprises a base having a weight scale affixed at one end thereof, with the scale including a golf club grip retainer thereon positioned to place the end of the grip at the origin of the linear scale. The retainer also limits oscillations of the club, thereby providing for the rapid and accurate determination of the center of gravity of the club when balanced upon the fulcrum of the instrument. The base also includes a linear track therein and parallel to the linear scale, with the track providing for the adjustable positioning of the fulcrum therein. The device may include weight scales using either electronic load cells or strain gauges or mechanical operation, as desired. Thus, the present survey instrument provides for the rapid and accurate determination of a number of different golf club characteristics, thereby enabling a technician to make adjustments to the total weight and distributed weight of each club of a set as required to match a set of golf clubs accurately for weight, swing weight, and center of gravity.

20 Claims, 5 Drawing Sheets

GOLF CLUB SURVEY INSTRUMENT WITH VARIABLE FULCRUM

REFERENCE TO RELATED PATENT APPLICATION

This application is a continuation in part of U.S. patent application Ser. No. 08/659,925, filed on Jun. 7, 1996.

BACKGROUND OF THE INVENTION

1. Field of the Invention

The present invention relates generally to devices for measuring the weights of objects, and more particularly to a survey instrument providing for the measurement of the total weight and swing weight of a golf club, and also for the determination of the center of gravity of a golf club. The versatility of the present instrument is provided by a variably positionable fulcrum, enabling the device to measure the total weight of a club as well as the weights at any point along the arm or length of the club, to determine various moments of the club. The present instrument is thus more properly considered as a golf club survey instrument rather than merely a weighing scale, due to its great versatility in the measurement of such numerous mass related characteristics of a golf club, each of which affect the club. The present instrument may also be used to weigh various different components of a golf club, as well as the entire club, and to measure the length of the club or various components thereof (shaft, grip, etc.).

2. Description of the Prior Art

The game of golf is extremely popular throughout the entire world, and both the serious amateur and the professional golfer seek every refinement and advantage possible. Obviously, a set of golf clubs includes numerous attributes which may be adjusted, such as club shaft length and flex, club face angle and weight, grip, and mass distribution throughout the club and shaft, or swing weight. The swing weight is generally defined as the moment (in inch-ounces) required to balance a golf club at a point either fourteen or twelve inches (depending upon the system used) from the upper end of the grip, and is considered to be an important parameter of club similarity.

With the advent of advanced and light weight materials (carbon fiber shafts, titanium "irony" club heads, etc.), it can be quite difficult to provide this sameness of feel in different types of clubs, due to the relatively large amount of mass which may be required in either the grip or the club head. It will be seen that two different clubs may have equal total weights and swing weights, but due to different club lengths (e.g., a three wood with an overall club length which is longer than a nine iron), the two clubs will have different center of gravity locations as measured from some common datum or reference point of the two clubs, such as the extreme end of the club grips. This difference in center of gravity between the two clubs affects their respective moments of inertia and radii of gyration, thus affecting their respective feel, even though their total weights and swing weights are identical.

Golf club manufacturers have for some time carefully measured and adjusted the total weights and swing weights of their golf club sets in order to match the clubs of a set as closely as possible, particularly with higher quality club sets. However, relatively little attention has been paid to the centers of gravity of the clubs, as the prevailing philosophy has been that with clubs of closely matched weights and swing weights, the centers of gravity of the clubs would fall into an acceptable range. While this may be true for the casual player of the game, many skilled amateurs and professionals notice, and are affected by, subtle differences in the centers of gravity of different clubs within an otherwise matched set.

As the center of gravity of a club has not been considered to be significant in the past, the scales used for measuring swing weight have almost universally been unequal length arm mechanical units. Such scales use a relatively small balance weight or counterpoise adjusted along a relatively long arm from the fulcrum, to provide sufficient moment to counterbalance the higher weight of the object being weighed on a relatively short arm. The conflicting requirements for accuracy and rapid resolution have been discussed in the present inventor's parent application. Nevertheless, such scales are commonly used, as the fulcrum may be permanently positioned at the desired distance, e. g., 14 inches, from the reference point which is used to secure the grip end of the club in order to facilitate the determination of the swing weight for any club placed on the scale.

While such a fixed fulcrum scale may be used to determine the center of gravity of a golf club, the task is complicated and generally some calculation is required. Accordingly, a need will be seen for a golf club survey instrument having a variably positionable fulcrum, which instrument may be used to determine the total weight of the club, the weight of various components of the club, the swing weight of the club, and also the center of gravity of the club, simply and rapidly without undue calculation being required. The present scale also responds to the above noted problem of damping time by limiting the balance arm motion to an extremely small arc, to reduce the time required for oscillations to dampen out. While the present scale is particularly adapted for the measurement of various mass related characteristics of a golf club, it will be seen that it may be used for the simultaneous measurement of the mass characteristics of innumerable other objects as well, and/or for various golf club or other components. A discussion of the prior art known to the inventor, and its differences from the present invention, follows below.

U.S. Pat. No. 3,703,824 issued on Nov. 28, 1972 to Denis A. N. Osborne et al. describes an Apparatus For Comparing Moments Of Inertia Of Golf Clubs. Osborne et al. notes that it is conventional to grade golf club sets according to a common "moment of weight" about some point in each club in the set (column 1, lines 16–18). This is equivalent to the "swing weight" generally used, and Osborne et al. recognize that this measurement standard may be insufficient to provide a truly consistent feel between clubs. The Osborne et al. device comprises a scale arm having dual sliding weights thereon, with a single fixed fulcrum point below the arm. A club is placed on the arm, with the shaft and grip end of the club properly positioned. The first sliding weight is adjusted to the club length, and the second sliding weight is moved to balance the scale arm with club thereon. No direct readout of the weight or balance point of the club is provided. Rather, the first scale is preset according to club length, and the second scale (actually three different scales) is calibrated according to the moment of inertia of the club. The present survey instrument, with its single, fixed scale point and adjustable fulcrum, is considerably more versatile and provides a direct reading of weight or force applied, according to the position of the fulcrum.

U.S. Pat. No. 4,043,184 issued on Aug. 23, 1977 to Bernard Sayers describes an Apparatus For Measuring The Swing Weight Of Sporting Implements. Sayers utilizes a pressure sensitive transistor as the weight measurement transducer in his apparatus. The fulcrum of the device includes a laterally disposed notch therein, wherein the club shaft may be placed laterally to measure the total club weight. Swing weight is measured similarly to the procedure used in most of the above described devices, with the end of the grip captured by another component. As in the other devices discussed above, two separate weighing operations must be conducted to measure both the swing weight and total weight of a club. As the fulcrum is fixed, no direct measurement of the center of gravity of the club may be determined.

U.S. Pat. No. 4,058,312 issued on Nov. 15, 1977 to Alfred Stuff et al. describes a Golf Club having a radially offset weight in the grip end, serving to counterbalance the offset mass of the club head from the shaft and to resist torquing of the club during the swing. Stuff et al. also describe weighing each club of a set of clubs in order to balance each club at the same point somewhat below the grip. This is analogous to the swing weight concept discussed further above. A scale for this swing weight measurement is disclosed, but Stuff et al. note that the scale is conventional (column 3, lines 15–16), and in any case the scale shown does not have a variably positionable fulcrum.

U.S. Pat. No. 4,212,193 issued on Jul. 15, 1980 to John W. Turley describes an Apparatus And Method For Determining The Moment Of Inertia Of Golf Clubs And Like Objects. Turley refers to the moment of inertia of the clubs as their "dynamic swing weight" (col. 1, 1. 63–64), and to the determination of the moment of the clubs from a predetermined reference point as the "static swing weight" (col. 2, 1. 24–25). Accordingly, the Turley device operates dynamically by inducing a vibratory oscillation in the club, and then measuring the period of oscillation to calculate the moment of inertia of the club. The present invention is directed to the measurement of static mass, rather than dynamic characteristics. Moreover, Turley fails to provide any means for the measurement of the total weight of the club or any of its components, or for directly determining the center of gravity of a club, as provided by the present invention.

U.S. Pat. No. 4,261,566 issued on Apr. 14, 1981 to Ian C. MacDougall describes Golf Clubs having a consistent "swing index moment," i. e., the length of the club (less four inches) multiplied by the weight of the club. A scale having a fixed fulcrum is provided, with a balance beam marked directly in swing index moment quantities, rather than weight units. It would appear that the apparatus is effected by the center of gravity of the club, as the grip end of the club is held down by a retainer with the club resting upon a support along the grip. Thus, a club with a center of gravity disposed closer to the head, would produce a higher reading than a club of the same weight with the mass distributed closer to the grip. However, no indication of the center of gravity of the club is provided.

U.S. Pat. No. 5,094,101 issued on Mar. 10, 1992 to Herman A. Chastonay describes a Method For Dynamically Balancing Golf Clubs, comprising the balancing of each club in a set in order to provide substantially the same radius of gyration for each club. This entails the determination and possible adjustment of the center of gravity of each club in the set. Chastonay also describes prior art golf club scales, including a scale identical to that disclosed in the patent to Stuff et al. described further above. Chastonay notes that these fixed fulcrum scales are suitable for determining the swing weight of a club, but not for determining its center of gravity. Chastonay uses a simple, fixed fulcrum for his determination of center of gravity, as he is not concerned with other characteristics at this point.

U.S. Pat. No. 5,277,059 issued on Jan. 11, 1994 to Herman A. Chastonay describes a Method For Dynamically Balancing Golf Putters And Other Implements Using Radius Of Gyration As The Controlling Parameter. As the radius of gyration is dependent upon the length of the club shaft, the mass of the club, and the distance from the center of gravity to the contact point of the club head, the center of gravity and weight of the club must be determined. Chastonay determines the center of gravity in the same manner as in his '101 patent discussed immediately above, i. e., by balancing the club on a simple fixed fulcrum, with no numerical quantities being provided. Chastonay must use a separate scale for the determination of the total club length and distance from the center of gravity to the club head, while the present invention provides a fixed point of origin for the length scale and a moving fulcrum which is positionable along the scale to determine the club center of gravity without additional steps or calculations.

U.S. Pat. No. 5,285,680 issued on Feb. 15, 1994 to Donald J. C. Sun describes a Golf Club Measuring Apparatus And Method, comprising a telescoping arm with the innermost portion having a club length scale thereon. Both the outermost arm portion and innermost arm portion have a stop at their respective distal ends, with the club being sandwiched between the stops to establish its length. The dimension is read through a window adjacent the open end of the outermost arm portion. A movable weight scale is also provided, which may be positioned beneath the center of gravity of the club. When the club is balanced on the scale, the total weight of the club may be read directly from the scale. Sun then notes that "The length . . . between the balance point and the end of the shaft can then be measured . . . . " (column 3, lines 45 . 47) in order to determine the location of the center of gravity along the shaft. However, Sun fails to provide a linear scale along the outermost arm portion, where the movable fulcrum is located, allowing the center of gravity to be read directly. Instead, he apparently must rely upon a separate linear scale (not disclosed). The present invention provides a much clearer means of measuring the position of the movable fulcrum, thus allowing the center of gravity of a club to be determined much more readily.

U.S. Pat. No. 5,362,928 issued on Nov. 8, 1994 to John P. Pavlik describes a Scale With Rolling Fulcrum And Cylindrical Weights, adapted for use as a postage scale. The scale utilizes an upper arm having an inverted V cut transversely thereacross, with a cylindrical fulcrum placed therein. The fulcrum is relatively fixed within the inverted V channel. Pavlik makes use of the fact that ten standard pennies weigh very nearly one ounce, and uses groups of ten pennies as his counterpoise weights. No linear scale is provided for determining the center of gravity of an article weighed using the Pavlik scale. The Pavlik scale is not well adapted for the weighing of any articles other than mail, and no means is seen to provide for the weighing or determination of the center of gravity of a golf club, or any of its component parts, as provided by the present golf club survey instrument.

U.S. Pat. No. 5,417,108 issued on May 23, 1995 to Herman A. Chastonay describes a Method For Dynamically Balancing Golf Clubs On A Conventional Swing Weight Scale Using Radius Of Gyration As The Controlling Parameter. The method disclosed is similar to that of the '059 U.S. Patent to the same inventor, but Chastonay discloses a "conventional, prior art swing weight scale" (column 8, lines 11–12) in FIG. 1 of his patent. This scale has a fixed fulcrum and a linear scale calibrated according to swing weight reading. The scale disclosed does nothing to determine the center of gravity of the club, or to weigh the club or any component thereof, as provided by the present survey instrument.

British Patent Publication No. 443,209 accepted on Feb. 20, 1936 to Alexander G. Murdoch describes Improvements In And Relating To Apparatus For Testing The Balance Of Sports Implements. Different embodiments are disclosed, each having a tubular arm into which the handle or shaft of an implement is placed for testing. The length of the implement extending from the scale provides an indication of the moment of the article extending from the socket or arm. Otherwise, the scale embodiments disclose different mechanisms for transferring the moment to a scale readout. Neither the weight nor the center of gravity can be determined using the Murdoch scales, as the length of the articles is not measured and the articles placed in the scale are unbalanced and produce a moment force. No adjustably positionable fulcrums are disclosed in any of the Murdoch scales.

British Patent Publication No. 557,192 accepted on Nov. 9, 1943 to Robert Fraser describes Improvements In Apparatus For Use In Determining The Weight Distribution In Golf Clubs. The device comprises an upper club holder pivotally mounted in a frame, and a lower balance arm mounted in the frame below the club holder. The balance arm is connected to the club holder by means of a pair of tensile wires, as the apparatus is configured so no compressive forces are possible. No means of measuring the total club weight or center of gravity is provided by Fraser, as is provided by the present invention.

Finally, British Patent Publication No. 1,220,804 published on Jan. 27, 1971 to Denis A. N. Osborne et al. describes an Apparatus For Measuring Or Comparing The Moment Of Inertia Of Golf Clubs, comprising a balance with sliding weights. This patent is related to U.S. Pat. No. 3,703,824 issued to the same inventors, and discussed further above. The same points raised above, are also seen to apply here.

None of the above inventions and patents, taken singly or in combination, is seen to describe the instant invention as claimed.

SUMMARY OF THE INVENTION

Accordingly, it is a principal object of the invention to provide an improved golf club survey instrument with variably positionable fulcrum, capable of finding the total weight of a golf club or its components, the center of gravity of the club, the swing weight of the club, and the club length or portion thereof.

It is another object of the invention to provide an improved golf club survey instrument including a linear scale disposed parallel and adjacent to a track providing for the adjustable placement of the fulcrum of the present instrument, thereby providing for the measurement of the location of the fulcrum during the survey of a golf club.

It is a further object of the invention to provide an improved golf club survey instrument including a scale having retention means limiting the freedom of motion of the club, thus reducing the oscillation of the club and reducing the amount of time required for the scale to establish a rest position during weighing operations.

An additional object of the invention is to provide an improved golf club survey instrument which weight scale means may comprise electronic strain gauges or load cells, hydraulic or pneumatic pressure detection means, or mechanical means, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
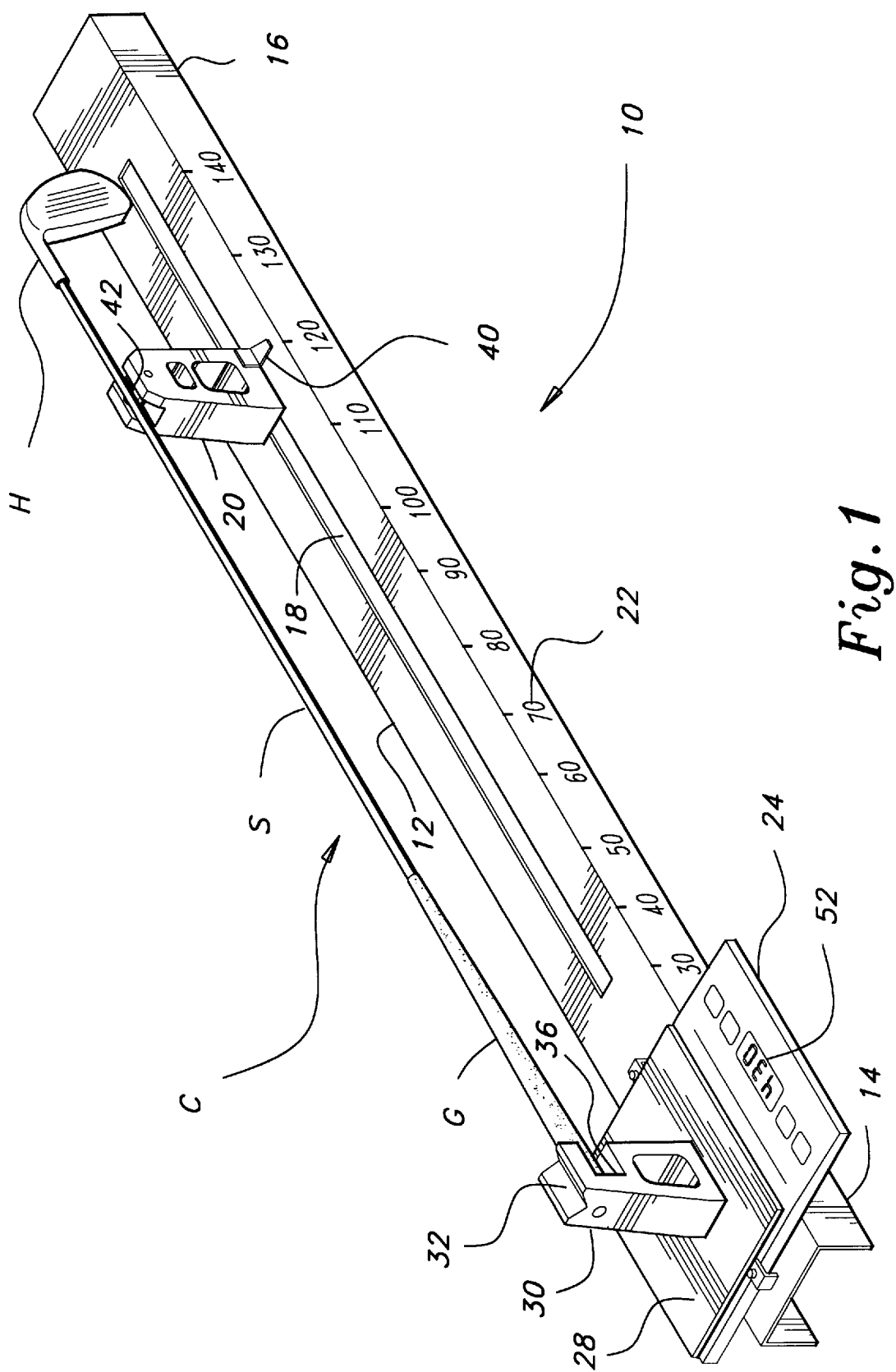
FIG. 1 is a front and top perspective view of the present golf club survey instrument with a golf club thereon, showing the general features of the instrument and an electronic weighing scale embodiment.
Figure 5:
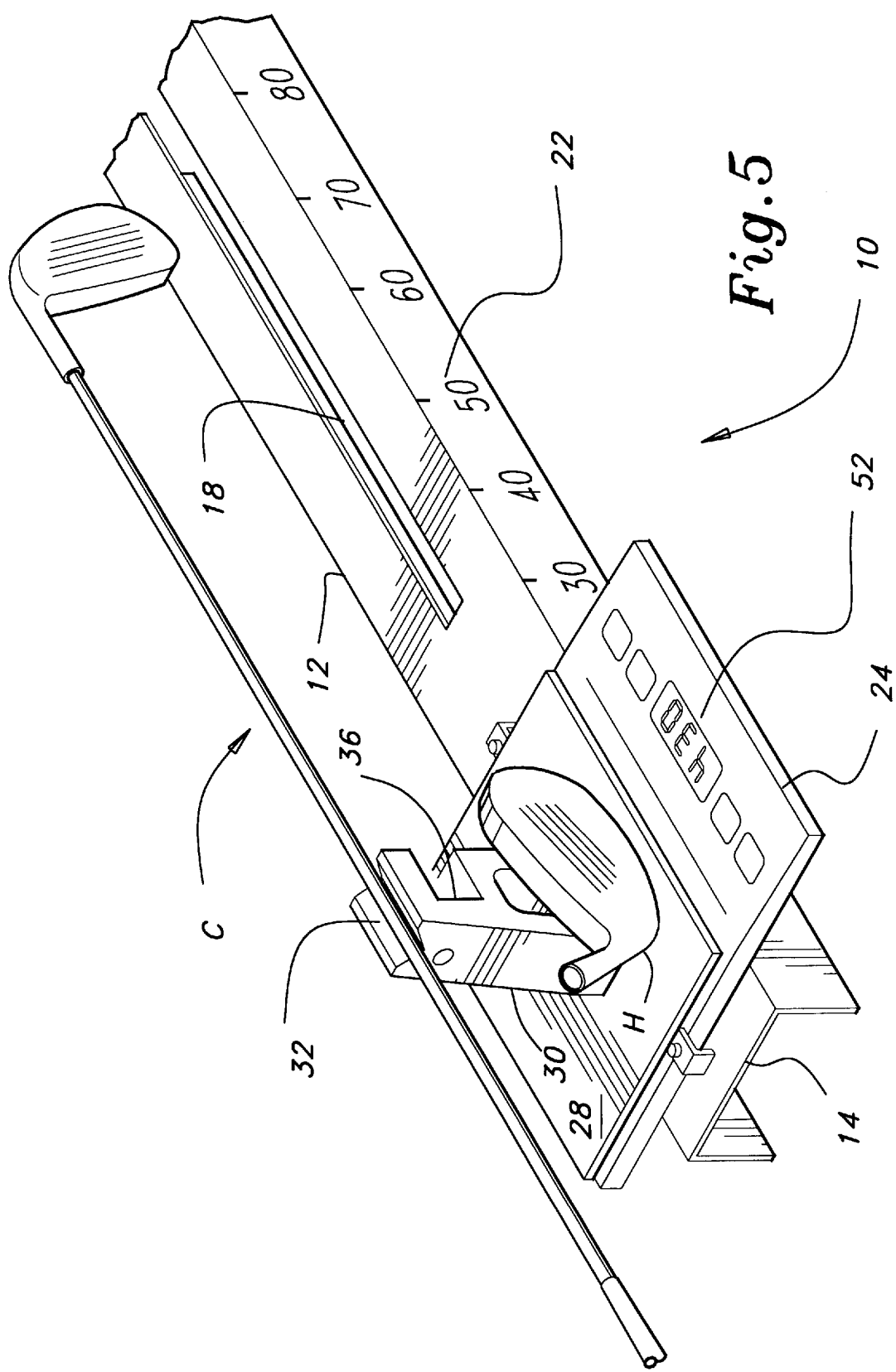
FIG. 5 is a broken away partial front and top perspective view of the weight scale end portion of the survey instrument embodiment of FIG. 1, showing the use of the scale in the determination of the weight of various separate golf club components.

The present invention relates to various embodiments of a golf club survey instrument, a first embodiment of which is designated with the numeral 10 in FIGS. 1 and 5. The instrument 10, and its other embodiments, is particularly well adapted for use in determining the total weight of a golf club C, weight of various components thereof, the center of gravity of the club, or the swing weight of the club, i. e., weight developed at a predetermined distance from the grip end of the club.

The survey instrument 10 includes a flat, elongate base component 12, which may be stamped or otherwise formed of an inverted, generally rectangular channel of material as shown, or otherwise configured. The base 12 has a first or weight measurement end 14, an opposite second end 16, and a fulcrum track 18 formed along the center of the base component and extending from a point near the first end 14 to a point near the opposite second end 16. The track 18 may comprise a slot, as shown, or a groove, channel, T- or I-section, or other suitable means of securing an adjustably positionable fulcrum 20 therealong. The base of the fulcrum 20 includes some conventional, cooperating attachment means (not shown) providing for the adjustable securing of the fulcrum 20 along the track 18 of the base 12, as desired. A linear measurement scale 22 is also provided adjacent to and parallel to the track 18. The scale 22 may be disposed along one edge or flange of the base 12, or may be located along the upper surface of the device, and plural scales (inch, metric, etc.) may be provided.

Figure 2:
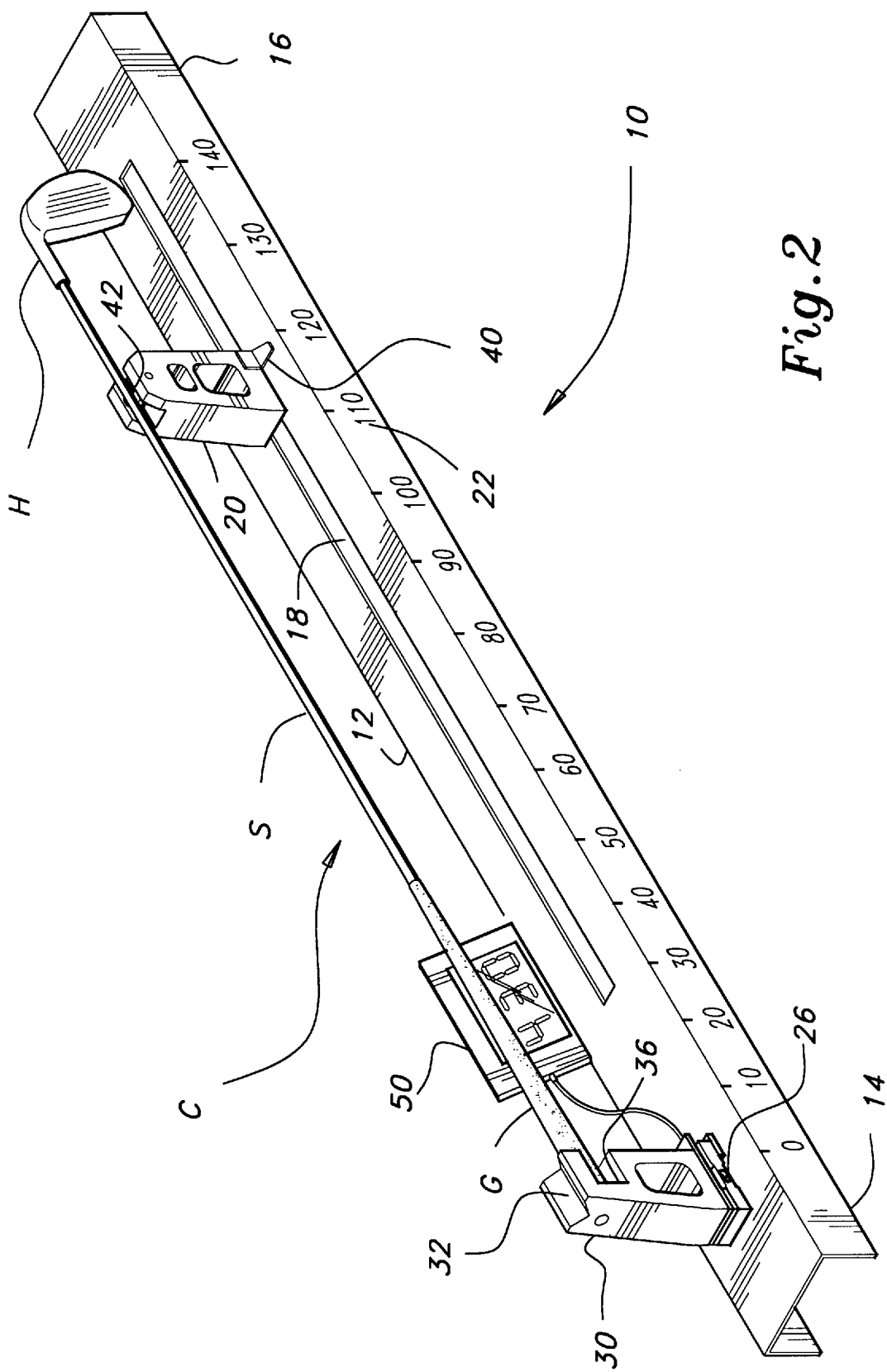
FIG. 2 is a front and top perspective view of the present survey instrument, showing an alternative electronic weighing scale embodiment.
Figure 4:
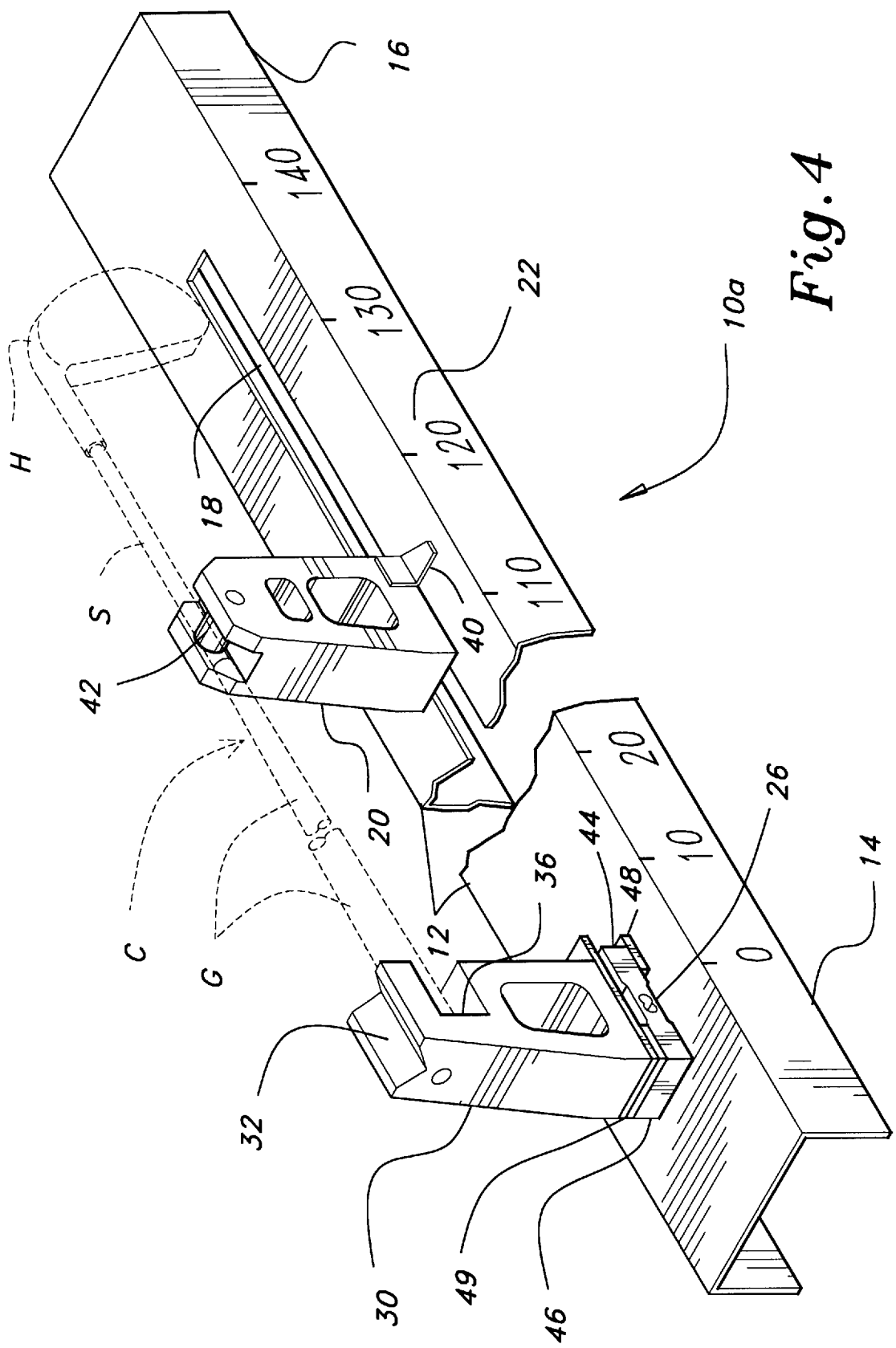
FIG. 4 is a fragmented front and top perspective view of the present survey instrument, showing details of the grip retention means at the weight scale portion of the device, and details of the adjustably positionable fulcrum.

Some form of weight measurement means is immovably affixed to the top of the base 12 adjacent the first end 14. This weight measurement means may be a scale 24 as shown in FIGS. 1 and 5, or some alternative means of measuring a weight or force applied thereto. The scale 24 of FIGS. 1 and 5 is a digital electronic device, utilizing a single conventional electronic strain gauge or load cell 26, as shown in FIGS. 2 and 4 and discussed further below. The scale 24 of FIGS. 1 and 5 also includes a weighing platform 28 forming the top of the scale 24, with the flat, planar surface of the platform 28 enabling the present golf club survey instrument to be used for the weighing of various club components, such as the club head H, grip G, shaft S, etc. as desired.

A golf club support 30 is affixed to the top of the weight measuring means (scale 24 or platform 28, etc.) in each of the embodiments, e. g., to the top of the scale platform 28 of FIGS. 1 and 5. The golf club support 28 comprises an elevated structure having a longitudinal groove or channel 32 formed in the top thereof. This groove 32 allows a golf club shaft S to be rested therein, so the present survey instrument 10 may be used to determine the total weight of a club C, as shown in FIG. 5. (It will also be noted that the platform 28 is being used for the weighing of a club head H. However, it will be understood that multiple components would not ordinarily be weighed simultaneously, as normally the goal would be to weigh an entire club C, or its various components, separately. The showing of both the club C and separate club head H in FIG. 5 are for illustrative purposes only.)

The club support 30 also includes a longitudinally disposed pin 34 extending in the direction of the fulcrum track 18. (The pin 34 is shown clearly in the embodiment of FIG. 3, and will be understood to be substantially similar in each of the other embodiments.) This pin 34 may extend from the front face of the club support 30, or may be disposed within a club grip end stop 36, as shown. (The location of the pin 34 within a recess, as in the end stop 36, provides an added degree of safety by reducing the possibility of injury from the otherwise protruding pin 34.) When the club C is being supported by the fulcrum 20, the extreme end of the club grip G is placed on the pin 34, to abut the club support end stop 36. The club support 30 is secured to the scale 24 so the end stop wall 36 is exactly in vertical alignment and even with the origin point 38 of the linear scale 22, as shown in FIG. 3.

Thus, when a golf club C having a conventional grip G with a hole in the end thereof is placed on the present instrument 10 with the pin 34 inserted into the grip hole and the end of the grip G abutting the end stop 36, the end of the grip G is automatically positioned in alignment with the scale 22 origin point 38, so that accurate linear reference may be made to any point along the length of the club C. Moreover, the pin 34 serves as a means of limiting lateral and vertical oscillation of the club C when the club C is balanced on the fulcrum 20, thereby reducing the time required to stabilize the position of the club C to determine the balance point of the club C, accurately. (Preferably, the pin 34 diameter is slightly smaller than the club grip hole, to avoid binding.)

The adjustably positionable fulcrum 20 of the present golf club survey instrument 10 may be positioned at any point along the fulcrum track 18, with an indicator 40 providing for the precise positioning of the fulcrum 20 at a point along the linear scale 22 as desired. The top of the fulcrum 20 includes a low friction roller bearing 42 disposed laterally thereacross, as is shown more clearly in FIG. 4. (Other bearing means may be used as desired.) This low friction bearing 42 allows the shaft S of the golf club C to roll and tilt freely thereon. Thus, the center of gravity of a golf club C may be determined to a fine degree of accuracy using the present survey instrument. The center of the bearing 42 is in exact vertical alignment with the reference line of the indicator 40, in order that the precise distance from the end of the club grip G (defined by the end stop 36 of the club support 30) to the balance point may be determined.

Figure 3:
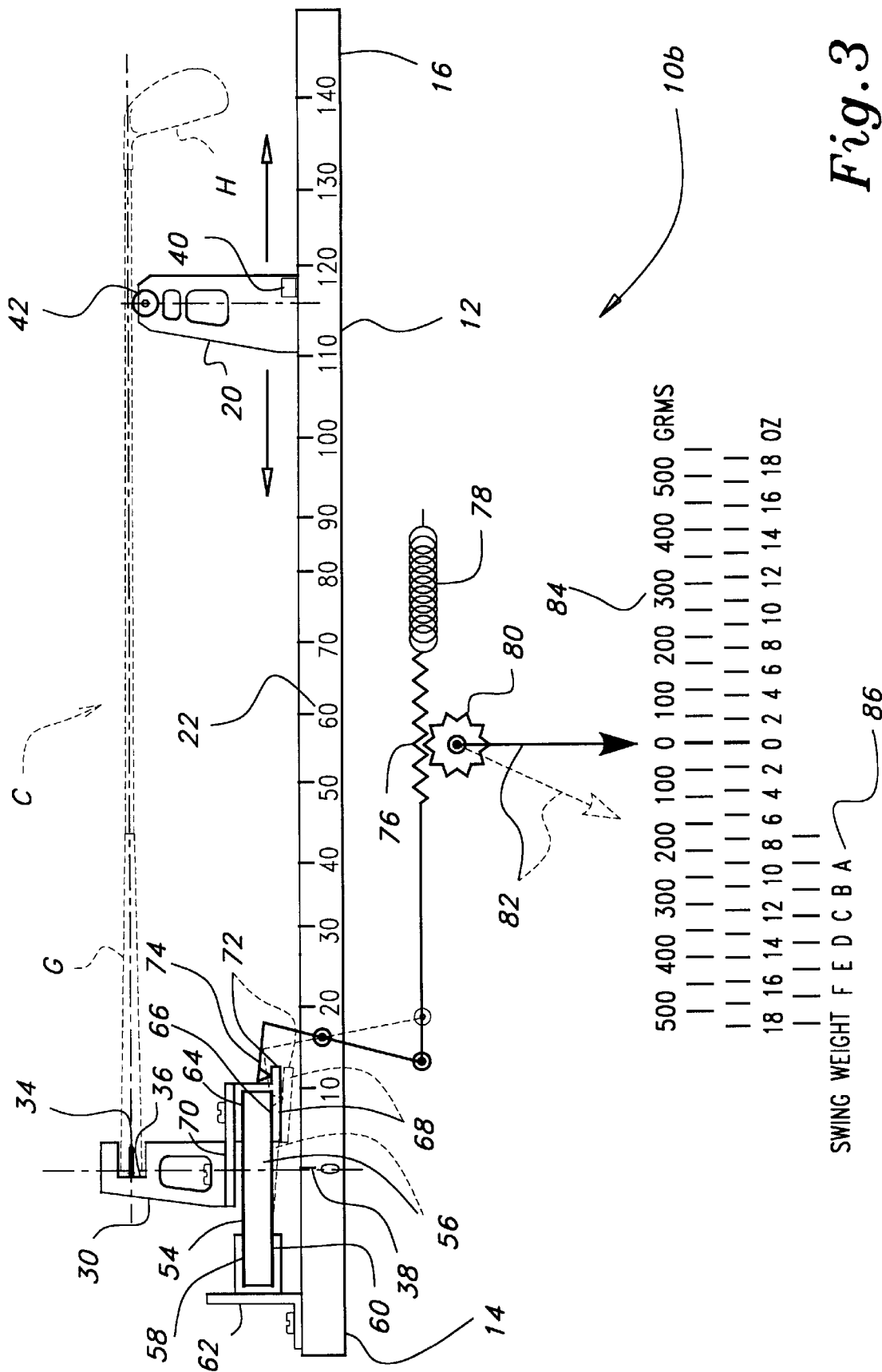
FIG. 3 is a front elevation view of the present survey instrument, showing an alternative mechanical weight scale embodiment.

As noted further above, the weight scale 24 of the survey instrument 10 embodiment of FIGS. 1 and 5 utilizes a conventional electronic strain gauge or load cell 26, shown more clearly in the embodiment 10a of FIGS. 3 and 4. Such devices are capable of determining the weight of an object by means of changes in the electrical properties of the cells as they are bent slightly or deflected by the weight of the object. Other weighing means may be substituted, as will be shown further below. As a further alternative, the alternate hydraulic and pneumatic weighing means described in the present inventor's previously filed U. S. patent application Ser. No. 08/659,925, may be used.

Details of the load cell or strain gauge 26 are shown more clearly in FIG. 4. The load cell or strain gauge 26 comprises an elongate bending beam with a first end 44 and an opposite second end 46. The first end 44 is immovably affixed to a base plate 48, which is in turn immovably affixed to the upper surface of the instrument base 12 near the first end 14 thereof. The opposite second end 46 of the load cell 26 is spaced above the instrument base 12 by the thickness of the load cell base plate 48, and is thus free to move slightly relative to the survey instrument base 12. However, the golf club support 30 is affixed to the upper side of the load cell 26 second end 46, by a support attachment plate 49. Thus, whenever a force in either direction (weight downwardly, or an upward lifting force) is applied to the club support 30, the load cell beam 26 will bend slightly, thus altering its electrical properties. This change in the electrical properties is detected by a conventional strain gauge force or weight measurement device (not shown, but similar to those disclosed in applicant's earlier filed application noted above), which provides a display of the force in a digital readout 50 (FIG. 2) or 52 (integral with the scale 24 of FIGS. 1 and 5).

An embodiment 10b of the present survey instrument is shown in FIG. 3, which uses a non-electronic, mechanical principle of operation for the determination of weight or force at the club support 30. (Essentially identical components are designated using the same reference characters throughout the present application.)

The survey instrument 10b incorporates a base 12 having first and second ends 14 and 16. An adjustably positionable fulcrum 20 is installed thereon, and a linear scale 22 is affixed along the base 12, in the manner of the survey instrument embodiments 10 of FIGS. 1 and 5, and 10a of FIGS. 2 and 4. However, rather than using a weight scale 24 and/or electronic load cell or strain gauge 26, the survey instrument 10b of FIG. 3 uses a mechanical weight measurement means. The weight measurement device of FIG. 4 includes a pair of equal length, flat, planar leaf springs, comprising a first or upper spring 54 and a second or lower spring 56. These springs 54 and 56 each have a first end, respectively 58 and 60, captured in a base attachment bracket 62, which also separates the two springs 54/56 and secures them to the base 12 adjacent the first end 14 thereof and spaces them above the base 12 to allow movement of the spring assembly during weighing operations. The opposite second ends, respectively 64/66, are captured within the spring leaf attachment portion 68 of a club support attachment bracket, which in turn supports the golf club support 30 by means of a golf club support attachment arm 70, which serves to space the club support 30 above the uppermost spring 54.

An extension tab 72 extends from the leaf attachment portion 68 of the club support attachment bracket, with a contact arm 74 movably resting on the extension tab 72. The contact arm 74 in turn drives a toothed rack 76, which is biased by a spring 78 to a predetermined force. The rack 76 in turn drives a pinion 80, which is connected to an indicator 82 to provide a readout on a scale 84.

The above described force readout indicator means, comprising components 72 through 84, provides a mechanical indication of the deflection of the two leaves 54 and 56 as weight or force is applied to the golf club support 30 either upwardly or downwardly. As an example of the above, the golf club C of FIG. 3 will be seen to have the overwhelming majority of its structure positioned to the left of the adjustable fulcrum 20. Even in consideration of the mass of the club head H, the majority of the mass of the club C will be positioned to the left of the fulcrum 20, thus producing a downward force on the club support 30 and deflecting second ends 64/66 of the leaf springs 54/56 downwardly. The spring leaf attachment 68 and extension tab 72 of the golf club support attachment bracket are also deflected downwardly, as indicated by the broken line showings of those two components in FIG. 3.

The downward deflection of the extension tab 72 allows the contact end of the contact arm 74 to deflect downwardly, causing the arm 74 to pivot counterclockwise due to the biasing action of the spring 78. This also drives the rack 76 across the pinion 80, causing the indicator hand 82 to move to indicate the downward force applied to the club support 30 on the weight scale 84.

While the above described mechanical system and readout indicator means serves to provide an indication of the force applied to the golf club support 30, it will be seen that other mechanical systems and linkages may also be applied to the present survey instrument to accomplish the same function. The scale 84 may be calibrated in ounces, grams, and/or swing weight, as indicated.

The present survey instruments 10, 10a, and 10b are each used to determine the center of gravity of a golf club C by placing the conventional hole in the grip of a conventional club over the limit pin 34 of the club support 30, and placing the extreme end of the club grip G against the end stop 36 of the club support 30. The shaft S of the club C is placed atop the fulcrum bearing 42. If the majority of the mass of the club C is to the left of the fulcrum 20, then the grip end G of the club C will apply a downward force to the electronic or mechanical scale means, as described above. The operator of the instrument need only slide the fulcrum 20 toward the club support 30 until the weight or force readout is at zero, thus indicating that there is neither an upward or a downward force at the club support 30, and that the club C is resting on the fulcrum 20 precisely at its center of gravity. This location may be read directly on the linear scale 22 at the fulcrum indicator 40. If the fulcrum 20 is initially placed too far to the left, the moments to the left and right sides of the fulcrum will result in the club tilting to the right, thus producing an upward force at the club support 30. The fulcrum 20 is then moved to the right, until the weight or force reading is zero.

Swing weight of a golf club C is also easily determined using the present instruments 10/10a/10b. Swing weight may be defined as the net moment of the club about a point located at a predetermined distance from the extreme end of the club grip. This point is usually fourteen inches from the end of the grip, but some systems use a reference point which is twelve inches from the end of the grip.

In the case of a fourteen inch reference distance, the fulcrum 20 is positioned fourteen inches (or 35.56 centimeters, using a metric scale) from the origin point 38 of the linear scale 22. The fulcrum 20 would be positioned twelve inches from the origin 38, in the case of a twelve inch reference point. The club C is placed on the survey instrument 10/10a/10b, and the force (in the case of swing weight, an upward force) is read out on the appropriate indicator means. This force may be in grams, ounces, or in accordance with a specially developed alphabetic or other swing weight scale, as in the swing weight scale 86 of FIG. 3. It will be seen that the digital electronic readouts 50 and 52, respectively of the instrument embodiments 10a and 10, may be programmed to provide alphabetical swing weight readouts, if so desired.

The present survey instrument, particularly in the embodiment 10 of FIGS. 1 and 5, is also well suited for measuring the total weight of a club C, or its various components. The user of the instrument need only place the club C in the groove or channel 32 atop the club support 30, with the entire weight of the club C being supported by the club support 30. The weight will appear on the readout or scale of the appropriate instrument. Individual components, such as the club head H, may also be weighed, particularly if a weighing platform 28 is provided for support of such components. (As noted further above, the entire club C and its components would be weighed separately. The showing of the club C and head H is for illustrative purposes.)

In summary, the above described golf club survey instrument 10/10a/10b, in any of its electronic or non-electronic embodiments, will be seen to provide a highly accurate means of checking the center of gravity, total weight, and swing weight relative to a predetermined datum point, of a golf club. Also, the length of the club C, or some component thereof such as the grip G or the shaft S, may be measured using the linear scale 22 along the base 12 of the instrument 10/10a/10b. A set of clubs may be quickly and easily checked using the present instrument, with total weight being adjusted as desired between clubs to provide the mass desired for each club.

The swing weight may be determined by positioning the fulcrum 20 at the desired fourteen or twelve inch reference point and placing the club C atop the fulcrum with the end of the grip G in place on the retaining pin 34, thereby enabling the technician to add or subtract weight as desired from the club head or grip area to provide the optimum swing weight for each club. The center of gravity of a club C is easily checked during the same operation, merely by moving the adjustably positionable fulcrum 20 to a neutral position beneath the club shaft S, determined by a zero indication on the appropriate weight scale, and noting the position of the fulcrum 20 on the linear scale 22. The scale platform provided in the embodiment 10 of FIGS. 1 and 5 is also useful for weighing separate golf club components, with the groove 32 of the club support 30 providing for the weighing of an assembled club.

The limited movement provided by the electronic load cell and mechanical spring embodiments of the present survey instrument, substantially reduce or eliminate weight scale oscillations and time required for the scale to reach equilibrium. Accordingly, a technician using the present golf club survey instrument will see his/her productivity increase substantially, resulting in more economical and precise adjustment of total weight, center of gravity, swing weight, and club matching for golfers.

It is to be understood that the present invention is not limited to the sole embodiments described above, but encompasses any and all embodiments within the scope of the following claims.

I claim:

1. A golf club survey instrument, comprising:

a flat, elongate base component having a first end and an opposite second end, with said first end including weight measurement means immovably affixed thereatop;

said weight measurement means including a golf club support affixed thereatop, and;

said base component further including adjustable fulcrum track means disposed therealong and an adjustably positionable fulcrum installed along said track means.

2. The golf club survey instrument according to claim 1, wherein:

said weight measurement means comprises an electronic weight measurement device.

3. The golf club survey instrument according to claim 2, wherein:

said electronic weight measurement device comprises an elongate load cell bending beam having a first end and an opposite second end, with said first end of said load cell beam being secured to a base plate and having electronic strain gauge weight measurement means secured thereto, and said second end of said load cell beam being spaced apart from said base plate and including said article support secured thereatop.

4. The golf club survey instrument according to claim 1, wherein:

said weight measurement means comprises a mechanical weight measurement device.

5. The golf club survey instrument according to claim 4, wherein:

said mechanical weight measurement device comprises an upper spring leaf and a lower spring leaf spaced apart from said first leaf;

each said leaf having a first end affixed in a base attachment bracket, with said attachment bracket being affixed to said base;

each said leaf further having a second end opposite each respective said first end, with each said second end being affixed in a golf club support attachment bracket;

said golf club support attachment bracket having a leaf attachment portion suspended above said base, and a golf club support attachment arm extending above and spaced apart from said upper leaf, with said attachment arm having said golf club support affixed thereatop, and;

said golf club support attachment bracket communicating with force readout indicator means, adapted to indicate a force applied to deflect each said leaf through said golf club support and said golf club support attachment bracket.

6. The golf club survey instrument according to claim 1, including:

golf club oscillation limitation means.

7. The golf club survey instrument according to claim 6, wherein:

said golf club oscillation limitation means comprises a pin extending longitudinally from said golf club support, with said pin being adapted to extend into a hole provided in a conventional golf club grip to preclude significant lateral and vertical movement of the grip when a golf club is placed upon said fulcrum for survey.

8. The golf club swing weight scale according to claim 1, including:

a weighing platform disposed atop said weight measurement means, with said weighing platform having a flat, planar surface adapted to support various components thereon for weighing, and with said golf club support being affixed atop said weighing platform.

9. The golf club survey instrument according to claim 1, including:

golf club retention means disposed atop said golf club support, comprising a groove formed therein to preclude displacement of a golf club placed thereatop.

10. The golf club survey instrument according to claim 1, including:

low friction bearing means disposed atop said fulcrum, comprising a lateral roller bearing.

11. A golf club survey instrument, comprising:

a flat, elongate base component having a first end and an opposite second end, with said first end including weight measurement means immovably affixed thereatop;

said weight measurement means including a golf club support affixed thereatop, and;

said base component further including adjustable fulcrum track means disposed therealong and an adjustably positionable fulcrum installed along said track means, and a linear measurement scale disposed along said base and parallel and adjacent to said track means.

12. The golf club survey instrument according to claim 11, wherein:

said weight measurement means comprises an electronic weight measurement device.

13. The golf club survey instrument according to claim 12, wherein:

said electronic weight measurement device comprises an elongate load cell bending beam having a first end and an opposite second end, with said first end of said load cell beam being secured to a base plate and having electronic strain gauge weight measurement means secured thereto, and said second end of said load cell beam being spaced apart from said base plate and including said article support secured thereatop.

14. The golf club survey instrument according to claim 11, wherein:

said weight measurement means comprises a mechanical weight measurement device.

15. The golf club survey instrument according to claim 14, wherein:

said mechanical weight measurement device comprises an upper spring leaf and a lower spring leaf spaced apart from said first leaf;

each said leaf having a first end affixed in a base attachment bracket, with said attachment bracket being affixed to said base;

each said leaf further having a second end opposite each respective said first end, with each said second end being affixed in a golf club support attachment bracket;

said golf club support attachment bracket having a leaf attachment portion suspended above said base, and a golf club support attachment arm extending above and spaced apart from said upper leaf, with said attachment arm having said golf club support affixed thereatop, and;

said golf club support attachment bracket communicating with force readout indicator means, adapted to indicate a force applied to deflect each said leaf through said golf club support and said golf club support attachment bracket.

16. The golf club survey instrument according to claim 11, including:

golf club oscillation limitation means comprising a pin extending longitudinally from said golf club support, with said pin being adapted to extend into a hole provided in a conventional golf club grip to preclude significant lateral and vertical movement of the grip when a golf club is placed upon said fulcrum for survey.

17. The golf club survey instrument according to claim 11, wherein:

said golf club support includes a golf club grip end stop, and said linear measurement scale has an origin in vertical alignment with said golf club grip end stop of said golf club support.

18. The golf club swing weight scale according to claim 11, including:

a weighing platform disposed atop said weight measurement means, with said weighing platform having a flat, planar surface adapted to support various components thereon for weighing, and with said golf club support being affixed atop said weighing platform.

19. The golf club survey instrument according to claim 11, including:

golf club retention means disposed atop said golf club support, comprising a groove formed therein to preclude displacement of a golf club placed thereatop.

20. The golf club survey instrument according to claim 11, including:

low friction bearing means disposed atop said fulcrum, comprising a lateral roller bearing.

* * * * *